UNITED STATES PATENT OFFICE.

LOUIS J. GUREVICH AND RAYMOND W. WOODWARD, OF WASHINGTON, DISTRICT OF COLUMBIA.

SOLDERING ALLOY.

1,301,688.      Specification of Letters Patent.      Patented Apr. 22, 1919.

No Drawing.      Application filed July 16, 1918. Serial No. 245,217.

(FILED UNDER THE ACT OF MARCH 3, 1883, 22 STAT. L., 624.)

*To all whom it may concern:*

Be it known that we, LOUIS J. GUREVICH and RAYMOND W. WOODWARD, citizens of the United States, and employees of the Bureau of Standards, United States Department of Commerce, and legal residents, respectively, of the District of Columbia and of the State of Connecticut, residing at the city of Washington, in the District of Columbia, (whose post-office addresses are respectively 2373 Champlain st. N. W. and 1401 Columbia road N. W.,) have invented certain new and useful Improvement in Soldering Alloys, and have made application by petition of even date herewith under act of March 3, 1883, chapter 143, (22 Stat., 624,) praying that Letters Patent therefor may be granted to us.

The invention herein described and claimed may be used by the Government of the United States or by any of its officers or employees in the prosecution of work for the United States, or by any person in the United States, without payment of any royalty thereon.

The following is a specification of the invention:

The object of this invention is to provide new alloys to replace the ordinary tin-lead solders at present in use, in order to conserve the tin supply of the United States, and also to provide an inexpensive solder which will securely join together such metals as tin plate, terne plate, galvanized iron, copper, brass and like metals.

It is another object of this invention to provide a solder which may be used in the manner of ordinary tin-lead solder, and which in its application to the metal parts will stick or adhere thereto.

Our improved solders consist essentially of lead and cadmium. Tin, in small quantities considerably improves the compositions, but is not absolutely necessary.

The composition which we prefer comprises the following ingredients in the proportions specified:

Lead_____80 per cent.
Cadmium_____10 per cent.
Tin_____10 per cent.

The cadmium content may vary from 5 to 20 per cent., but where tin is present an excess of over 10 per cent. of cadmium is without benefit.

While we prefer the proportion of tin specified, the proportion of tin used may range anywhere from zero to 20 per cent. Thus, we have found that 90 per cent. lead and 10 per cent. cadmium solder gave substantially the same adhering properties as the preferred solder. While tin is not absolutely necessary, its addition is desirable as these alloys in which tin is absent oxidize very easily in the molten condition, and their manufacture becomes difficult.

While we find that our improved alloy is especially adapted to soldering tin and terne-plate, galvanized iron, copper, brass and like metals, we do not intend to confine ourselves to this particular use, inasmuch as it may be found serviceable for soldering other metals.

Having now fully described our invention, what we desire to claim and protect by Letters Patent is:

1. An alloy for securedly soldering metals containing a preponderating amount of lead, ten per cent. of cadmium, and ten per cent. of tin.

2. An alloy for securedly soldering metals containing a preponderating amount of lead, from 5 to 20 per cent. of cadmium, and up to 20 per cent. of tin.

In testimony of which invention we have hereunto set our hands at Washington, D. C., on this 11th day of July, 1918.

LOUIS J. GUREVICH. [L. S.]
RAYMOND W. WOODWARD. [L. S.]

Witnesses:
HENRY D. HUBBARD,
LOIS CRUMP.